Patented Feb. 25, 1930

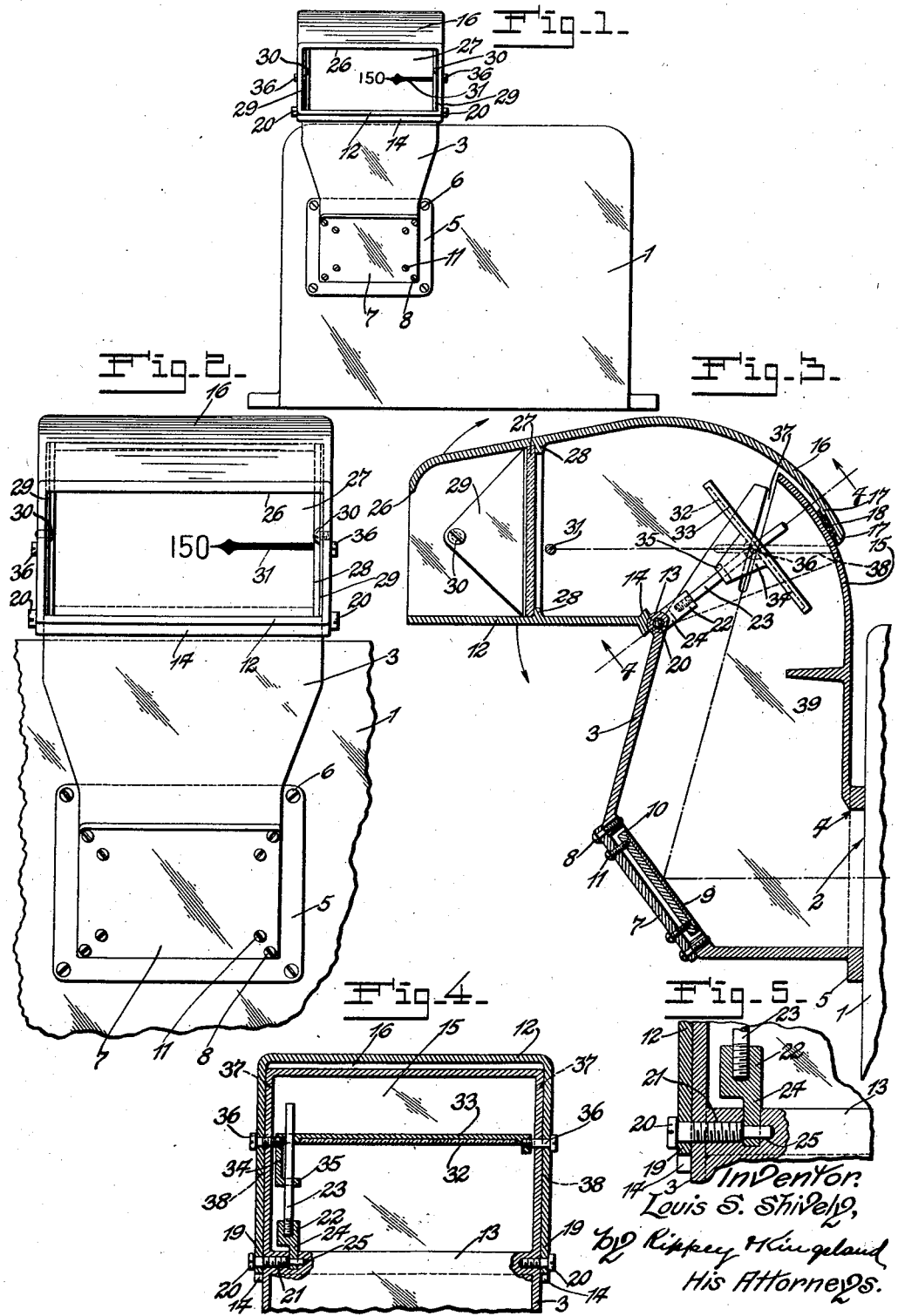

1,748,624

UNITED STATES PATENT OFFICE

LOUIS S. SHIVELY, OF ST. LOUIS, MISSOURI, ASSIGNOR TO THE WEIGHTOGRAPH COMPANY, OF ST. LOUIS, MISSOURI, A CORPORATION OF MISSOURI

PERISCOPE

Application filed February 26, 1926. Serial No. 90,806.

This invention relates to improvements in periscopes and consists in the novel construction herinafter disclosed.

The invention is applicable primarily to automatic weighing scales in which the weight indicia is projected upon a screen, whereby the magnified image of the transparent graduated scale of the weighing mechanism is projected and centered on the screen in such a manner as to give a visible indication of the scale load.

The known art includes the projection of the indicia on the transparent scale through an optical system of lenses and reflecting surfaces upon a screen having a set position. The limitations of a structure in which the screen has a set position are that, in order to obtain a view of the centered image, the line of sight to the image is required to be substantially on a line perpendicular to the set plane of the screen so that the image may be read only from a predetermined elevation.

An object of this invention is to remove this limitation and to make the sight housing adjustable so that the image on the screen may be read from different elevations.

Another object of the invention is to provide for changing the angularity of the plane of the screen and of the sight housing in which it is mounted in respect of a housing having a fixed position, together with means for varying the relative angularity of the reflecting surfaces so that a true image will be projected upon the screen, regardless of the adjustment thereof.

The structure has uses broader than the specific embodiment in a scale, and has also additional advantages which will be apparent from the following detailed description thereof, taken in connection with the accompanying drawing, in which Fig. 1 is a front elevation showing the device attached to the front plate of a scale;

Fig. 2 is an enlarged view in front elevation;

Fig. 3 is a vertical section;

Fig. 4 is an inclined section on the line 4—4 of Fig. 3; and,

Fig. 5 is a detail view illustrating the pivot connection between the fixed and adjustable housing.

In the embodiment of the invention illustrated in the drawing, the device is shown in connection with a front plate 1 of an automatic weighing scale in which the transparent movable indicia scale of the weighing mechanism is magnified and projected forwardly in a horizontal plane by a lens system through an opening 2 in the plate. A housing 3 comprising preferably a casing forming a vertically extending enclosure has an opening 4 therein that alines with the opening 2 in the front plate of the scale for the admission of light to the housing 3. Around the opening 4 is a flange 5 and the housing 3 is removably secured to the scale member by screws 6 passing through the flange and into the face of the scale member.

The lower portion of the front wall of the housing 3 comprises a removable plate 7 which is secured in position by screws 8 extending through the plate and into the wall of the housing 3 near the margin of the opening covered by said plate 7.

A reflector 9 is carried in a frame 10, the said frame being adjustably connected with the inner face of the plate 7 by screws 11. The reflector 9 is in alinement with the opening 4 in the housing and is set at an angle so that the image projected forwardly from the lens system will be deflected in a vertical direction toward the top of the housing 3.

An adjustable housing 12 is hinged to the upper portion of the housing 3 on a fulcrum connecting the lower wall of the housing 12 with the edge of the front wall of the housing 3. The movable joint between the housings 3 and 12 is designed to exclude light and the joint is formed by providing a semi-cylindrical bead 13 on the upper marginal edge of the front wall of the housing 3 against which the inner surface of a segmental flange 14 on the rear marginal edge of the lower wall of the housing 12 fits. It will be understood that the housings 3 and 12 are so dimensioned that the adjacent walls of the two housings telescope, the walls of the housing 12 fitting over the walls of the housing 3. By reference to Fig. 3 of the drawing, it will be noted that the upper portion of the rear wall of the housing 3 is curved at 15 and that the rear portion of the upper wall of the housing 12 has a curved portion 16 paralleling the curved portion of the portion 15 of the housing 3.

Adjacent to the marginal edge of the upper wall of the housing 12 are spaced beads 17 forming a channel therebetween in which the packing material 18 is placed to form a light-tight joint between the upper walls of the two housings.

The pivot pins upon which the housings 3 and 12 are fulcrumed are illustrated in detail in Figs. 4, and 5 from which it will be understood that the housing 12 is provided with alined segmental flanges 19 that extend across the axis of the bead 13, said flanges having alined openings therethrough and through which shouldered screws 20 extend, the screws threading into threaded openings 21 in the ends of the beads 13. On one side, the screw 20 in addition to forming the fulcrum pin for the connection of the two housings, serves to pivotally support a bracket 22 for a guide rod 23, the bracket 22 having a depending arm 24 that fits into a notch 25 in the upper face of the bead 13 and the inner end of the screw 19 is turned down to fit through an opening in the lower end of the arm 24 of the bracket 22, thereby pivotally supporting the bracket 22.

From the construction above described, it will be understood that the housing 12 may be adjusted by moving it upon a horizontal axis through the pivot connection between the walls of the housings 3 and 12. The packing 18 constitutes a frictional engagement between the upper walls of the two housings and serves to frictionally hold the housing 12 in the predetermined positions in which it may be set by elevating or depressing the forward end thereof.

Within the housing 12 and set backwardly a sufficient distance so that it will be screened by the forward portion of the walls of the housing and will be readily visible through the sight opening 26 thereof is a screen 27 preferably comprising a ground glass panel. The screen 27 is removably supported within the housing 12 by providing a flange 28 around the inner wall of the housing against which the panel fits and is held in place by a pair of removable clips 29 secured to each side wall of the housing by screws 30.

When the device is used in connection with scales, a pointer 31 supported by one of the side walls of the housing 12 extends transversely across the path of rays of light projected upon the screen 27 and serves as an indicator to mark the centering of the projected scale strip as graphically illustrated in Figs. 1 and 2 of the drawings.

Obviously, as the angularity of the housing 12 and therefore the angularity of the plane of the screen 27 in respect of the fixed housing and the fixed reflector 9 is changed, in order to preserve the adjustment of the instrument and to afford a true reflection of the image, it is necessary to provide an adjustable reflector having a movement coordinated with the movement of the housing. This is accomplished by an automatically adjustable reflector, the angle of which is changed automatically by the movement of the housing 12. This adjustable reflector comprises a reflecting panel 32 set in a frame 33, said frame having a depending angular bracket 34 having an arm 35 extending at right angles to the lower wall thereof. There is an alined opening through the arm 35 and the wall of the frame through which the guide rod 23 extends.

The frame 33 is fulcrumed on pins comprising the screws 36, said screws being supported in adjustable bearings formed by the intersection of slots 37 and 38 cut in the side walls of the housing 3 and the housing 12, it being understood that there is a pair of intersecting slots for each of the pins 36. These slots are formed with a definite relationship, so that the rays of light reflected from the mirror 32 will always be projected against the screen 27 at the same angle, regardless of the position of the housing 12, and of the screen.

The slots 37 being in the permanent housing remain fixed and the axes thereof are coincident with the line of reflection from the mirror 9. The slots 38, being in the movable member, change angularity with the movement of the sight housing 12. The axes of both the slots 37 and of the slots 38 are equidistant from the common fulcrum point of the housing. The axis of the guide rod 23 is perpendicular to the face of the plane of the mirror 32, and the fulcrum of the guide rod is coincident with the main fulcrum of the movable housing. The screen, being fixed in the housing 12, changes its angularity with the movement of the sight housing.

Since the axis of the pivot pins 36 of the reflector 32 is coincident with the face of the reflector, and the pivot pins are supported at the intersection of the slots 37 and 38, the face of the mirror 32 will be automatically adjusted so that the angle of the light rays reflected from the mirror 32 will always intersect the plane of the screen 27 at the same angle, and thereby center the image on the screen. This is true because the sum of the angles of incidence and reflection plus the intermediate angle will equal 180 degrees, and as the intermediate angle formed by the intersection of the slots changes angularity in proportion to the change of angularity of the housing 12 in respect of the housing 3, the angle of incidence and the angle of reflection will be equally increased and diminished according to the increase or diminution of the angle between the two housings which is equal to the intermediate angle between the angle of incidence and the angle of reflection. It is apparent, therefore, that regardless of the position of the sight housing, the angle of reflection will always be perpendicular to the face of the screen so that the image will be projected without distortion and accurately centered upon the screen.

In order to limit the range of movement of the sight housing, it will be noted that the lower edge of the segmental flange 14, when it abuts against the face of the front wall of the housing 3, acts as a stop for the downward movement of the housing. The upward movement of the housing 12 is limited by the fulcrum pins 36 of the frame 33 abutting against the base of the slots 37 and 38.

A baffle wall 39 projects into the housing 12 and prevents any of the light rays from being deflected back of the reflector, thus avoiding dimming of the image on the screen by any illumination back of the screen other than the direct rays reflected from the reflector 32.

I am aware that the invention may be modified in various particulars without departure from the spirit and scope thereof, but what I claim and desire to secure by Letters Patent is:

1. A device of the class described comprising a fixed housing having an opening for admission of light, a reflector mounted in said housing, an adjustable sight housing having hinged relationship with said fixed housing, a translucent screen in said sight housing, an adjustable reflector between said first named reflector and said screen, and means for changing the angle of said adjustable reflector incident to the movement of said adjustable housing for projecting the rays of light from said adjustable reflector in a constant direction with respect to the adjustable housing, irrespective of the position of said adjustable housing.

2. A device of the class described comprising a fixed housing provided with an opening for admission of light, a reflector for deflecting the light rays in a vertical path in said fixed housing, an adjustable housing arranged at an angle in respect of said fixed housing and being hinged thereto, a translucent screen for receiving a reflected image carried by said adjustable housing, an adjustable reflector intermediate said first named reflector and said screen, and automatic means operated as an incident to the movement of said adjustable housing to change the angle of said last named reflector, whereby the angle of incidence and angle of reflection are increased or decreased to reflect the rays of light at a constant angle in respect to the screen.

3. A device of the class described comprising a fixed housing having an opening for admission of light, a reflector in said fixed housing for deflecting the light rays, a housing angularly adjustable in respect of said first named housing, a screen for receiving the image having a fixed relationship with said adjustable housing, a reflector intermediate said first named reflector and said screen, a fulcrum for said last named reflector having a movable axis, and means operated by the movement of said adjustable housing for predetermining the axis of said last named reflector and the angle of incidence to said last named reflector and the angle of reflection from said last named reflector to said screen are increased or diminished to reflect the rays of light at a constant angle in respect to the screen when the angle of the plane of the screen is changed by the movement of said adjustable housing.

4. A device of the class described comprising a fixed housing provided with an opening for admission of light, a reflector in said fixed housing for changing the direction of the light rays entering said housing, a pair of slots formed in said fixed housing, an adjustable housing hinged to said fixed housing, said adjustable housing having a pair of slots intersecting the slots in said fixed housing and the slots in each housing having their axes equidistant from the hinge connection between the said housings, a screen for receiving the image in said adjustable housing, a reflector having pivot connections riding in the intersection of said slots, and a guide device for maintaining a relative position of the face of said last named reflector with the axis of the hinge connection.

5. A device of the class described comprising a pair of angularly adjustable housing members forming an enclosure for a path of light, the angularity of which is changed, a screen for receiving a reflected image mounted in one of said housing members, a reflector system including a pivoted mirror, and a connection operated incident to the movement of the housing members in respect of each other, whereby the angularity of said mirror is changed to reflect the image perpendicular to the face of said screen in any adjustment of said housing members.

6. A device of the class described comprising a pair of angularly adjustable housing members forming an enclosure for a path of light, the angularity of which is changed, a screen for receiving a reflected image mounted in one of said housing members, a reflector system including a pivoted mirror, and a connection operated incident to the movement of the housing members in respect of each other for changing the pivot axis of said mirror.

7. A device of the class described comprising a pair of angularly adjustable housing members forming an enclosure for a path of light, a pivot upon which said members move in respect of each other, a screen for receiving a reflected image mounted in one of said housing members, a reflector system including a pivoted mirror, a movable pivot connection between the mirror and the housing members, and a connection between said movable pivot and the pivot upon which the housing members move whereby movement of the housing members in respect of each other moves the pivot for the mirror for causing a constant reflection from said mirror.

LOUIS S. SHIVELY.